United States Patent
Siohan et al.

(10) Patent No.: US 9,479,381 B2
(45) Date of Patent: Oct. 25, 2016

(54) METHOD FOR TRANSMITTING AT LEAST ONE MULTI-CARRIER SIGNAL CONSISTING OF OFDM-OQAM SYMBOLS

(71) Applicant: ORANGE, Paris (FR)

(72) Inventors: Pierre Siohan, Rennes (FR); Bruno Jahan, Tinteniac (FR); Dinh Thuy Phan Huy, Paris (FR); Maryline Helard, Rennes (FR); Thierry Dubois, Rennes (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 14/364,971

(22) PCT Filed: Dec. 19, 2012

(86) PCT No.: PCT/FR2012/052995
§ 371 (c)(1),
(2) Date: Jun. 12, 2014

(87) PCT Pub. No.: WO2013/093340
PCT Pub. Date: Jun. 27, 2013

(65) Prior Publication Data
US 2014/0348252 A1   Nov. 27, 2014

(30) Foreign Application Priority Data

Dec. 23, 2011   (FR) ..................... 11 62407

(51) Int. Cl.
*H04L 27/10*   (2006.01)
*H04L 27/26*   (2006.01)
(Continued)

(52) U.S. Cl.
CPC ......... *H04L 27/2698* (2013.01); *H04L 1/0668* (2013.01); *H04L 27/264* (2013.01); *H04L 27/2626* (2013.01); *H04L 27/368* (2013.01); *H04B 7/0669* (2013.01)

(58) Field of Classification Search
CPC ... H04L 27/34; H04L 27/362; H04L 1/0071; H04L 25/03834; H04L 1/0041

USPC ................. 375/229–235, 259–285, 295–352
See application file for complete search history.

(56) References Cited

U.S. PATENT DOCUMENTS

| 6,278,686 B1 * | 8/2001 | Alard .................. H04L 27/0004 |
| | | 370/204 |
| 6,584,068 B1 * | 6/2003 | Alard .................. H04L 27/2602 |
| | | 370/208 |

(Continued)

FOREIGN PATENT DOCUMENTS

| FR | 2733869 A1 | 11/1996 |
| FR | 2930094 A1 | 10/2009 |

(Continued)

OTHER PUBLICATIONS

U.S. Appl. No. 14/365,003, filed Jun. 12, 2012, Saadani et al.

(Continued)

*Primary Examiner* — James M Perez
(74) *Attorney, Agent, or Firm* — Knobbe Martens Olson & Bear LLP (57) ABSTRACT

Disclosed is a transmission method of transmitting at least one multicarrier signal made up of OFDM-OQAM symbols to a receive antenna of a receiver device, the transmission method being for use by a transmitter device having at least one transmit antenna. In one embodiment, the method comprises, for each transmit antenna of the transmitter device, filtering OFDM-OQAM symbols associated with the transmit antenna using a time-reversal prefilter defined from an estimate of the transmission channel between the transmit antenna and the receive antenna and transmitting the filtered OFDM-OQAM symbols via the transmit antenna over the transmission channel.

14 Claims, 2 Drawing Sheets

(51) Int. Cl.
*H04L 1/06* (2006.01)
*H04L 27/36* (2006.01)
*H04B 7/06* (2006.01)

(56) References Cited

U.S. PATENT DOCUMENTS

| | | | |
|---|---|---|---|
| 7,724,835 B2* | 5/2010 | Naguib | H04L 1/0618 375/267 |
| 7,769,097 B2* | 8/2010 | Sandhu | H04L 1/0071 375/260 |
| 8,036,098 B2 | 10/2011 | Pereira et al. | |
| 9,118,365 B2 | 8/2015 | Phan Huy | |
| 2003/0021257 A1 | 1/2003 | Sato et al. | |
| 2003/0095533 A1* | 5/2003 | Joo | H04L 1/0618 370/343 |
| 2004/0013211 A1* | 1/2004 | Lindskog | H04L 1/0618 375/347 |
| 2004/0022183 A1* | 2/2004 | Li | H04L 27/2626 370/210 |
| 2004/0120274 A1* | 6/2004 | Petre | H04B 7/04 370/320 |
| 2004/0196919 A1* | 10/2004 | Mehta | H04B 7/061 375/267 |
| 2005/0152473 A1* | 7/2005 | Maltsev | H04L 27/26 375/299 |
| 2005/0157682 A1* | 7/2005 | Sandhu | H04L 1/0071 370/334 |
| 2005/0185575 A1* | 8/2005 | Hansen | H04B 7/0613 370/208 |
| 2008/0159423 A1* | 7/2008 | Omoto | H04L 27/2698 375/260 |
| 2008/0247482 A1* | 10/2008 | Mege | H04B 7/0848 375/262 |
| 2008/0260061 A1* | 10/2008 | Javaudin | H04L 27/2082 375/261 |
| 2009/0213949 A1* | 8/2009 | Javaudin | H04L 5/0048 375/260 |
| 2009/0316569 A1* | 12/2009 | Lele | H04L 25/0228 370/206 |
| 2010/0027410 A1* | 2/2010 | Sandhu | H04L 1/0068 370/210 |
| 2010/0226293 A1 | 9/2010 | Kim et al. | |
| 2010/0227566 A1 | 9/2010 | Kim et al. | |
| 2010/0227613 A1 | 9/2010 | Kim et al. | |
| 2010/0265813 A1 | 10/2010 | Pereira et al. | |
| 2011/0002408 A1* | 1/2011 | Javaudin | H04L 1/007 375/261 |
| 2011/0028101 A1 | 2/2011 | Phan Huy et al. | |
| 2011/0103457 A1 | 5/2011 | Phan Huy et al. | |
| 2011/0110458 A1* | 5/2011 | Siohan | H04L 27/2602 375/295 |
| 2011/0194551 A1 | 8/2011 | Lee et al. | |
| 2012/0008577 A1 | 1/2012 | Han et al. | |
| 2012/0014329 A1 | 1/2012 | Kwon et al. | |
| 2012/0099493 A1 | 4/2012 | Phan Huy et al. | |
| 2012/0127953 A1 | 5/2012 | Kawamura et al. | |
| 2012/0243625 A1* | 9/2012 | Berg | H04L 25/022 375/260 |
| 2012/0281780 A1 | 11/2012 | Huang et al. | |
| 2012/0307926 A1 | 12/2012 | Kuo et al. | |
| 2013/0286959 A1* | 10/2013 | Lou | H04W 72/04 370/329 |
| 2014/0348256 A1 | 11/2014 | Saadani et al. | |
| 2015/0124897 A1* | 5/2015 | Phan Huy | H04L 5/0023 375/267 |

FOREIGN PATENT DOCUMENTS

| | | | |
|---|---|---|---|
| GB | 2463508 A | | 3/2010 |
| WO | WO 2009/048256 A1 | | 4/2009 |
| WO | WO 2009/156703 A2 | | 12/2009 |
| WO | WO 2010/128234 A1 | | 11/2010 |
| WO | WO 2011/033217 A1 | | 3/2011 |
| WO | WO 2013/093274 A1 | | 6/2013 |
| WO | WO 2013/093341 A2 | | 6/2013 |

OTHER PUBLICATIONS

U.S. Appl. No. 14/365,038, filed Jun. 12, 2012, Phan Huy.
Alamouti, Siavash M., "A Simple Transmit Diversity Technique for Wireless Communications", IEEE J Select Areas Comm. (Oct. 1998) 16(8):1451-1458.
Gomadam et al. "Approaching the capacity of wireless networks through distributed interference alignment", IEEE Global Telecommunications Conference GLOBECOM, Dec. 2008.
Kumar et al. "An iterative algorithm for joint signal and interference alignment", IEEE International Symposium on Information Theory Proceedings (ISIT), (Jun. 2010) pp. 2293-2297.
Léléet al. "Channel estimation methods for preamble-based OFDM/OQAM modulations", European Wireless, Apr. 2007, 7 pages.
Negro et al., "Interference Alignment Limits for K-User Frequency-flat Mimo Interference Channels", 17th European Signal Processing Conference (EUSIPCO 2009), Glasgow, Scotland, Aug. 24-28, 2009; pp. 2445-2449.
Nguyen, Hung Tuan, "On the performance of one bit time reversal for multi-user wireless communications", 4th International Symposium on Wireless Communication Systems, IEEE, Piscataway, NJ, USA (Oct. 2007), pp. 672-676.
Tarokh et al., "Space-Time Block Codes from Orthogonal Designs", IEEE Trans Inform Theory (Jul. 1999) 45(5):1456-1467.
Wang et al., "Full Rate Orthogonal Space—Time Block Coding in OFDM Transmission Using Time Reversal", IEEE Wireless Communications and Networking Conference, IEEE, Piscataway, NJ, USA (Apr. 2009), pp. 1-6.
Zuccon et al. "Semantic spaces: measuring the distance between different subspaces", Proceedings of the 3rd International Symposium on Quantum Interaction, 2009; pp. 225-236.
International Search Report mailed Sep. 4, 2013 for Application No. PCT/FR2012/052995, filed Dec. 19, 2012.
International Search Report mailed Oct. 29, 2013 for Application No. PCT/FR2012/052996, filed Dec. 19, 2012.
International Search Report mailed Feb. 26, 2013 for Application No. PCT/FR2012/052762, filed Nov. 30, 2012.
U.S. Office Action dated Mar. 5, 2015 in co-pending U.S. Appl. No. 14/365,038.
Applicant Response to Office Action filed May 13, 2015 in co-pending U.S. Appl. No. 14/365,039.
U.S. Notice of Allowance dated Jun. 10, 2015 in co-pending U.S. Appl. No. 14/365,039.
Issue Fee Payment on Jul. 17, 2015 in co-pending U.S. Appl. No. 14/365,039.
Applicant Comments on Statement of Reasons for Allowance in co-pending U.S. Appl. No. 14/365,039.
U.S. Office Action dated Mar. 24, 2015 in co-pending U.S. Appl. No. 14/365,003.
U.S. Appl. No. 14/365,003, A Method of Grouping Transmitter-Receiver Pairs For Communicating Over a Communications Network, filed Jun. 12, 2014.
U.S. Appl. No. 14/365,038, A Method of Transmitting and Receiving Data Symbols, Jun. 12, 2014.
U.S. Office Action dated May 3, 2016 in co-pending U.S. Appl. No. 14/365,003.
U.S. Response dated Jul. 31, 2015 in co-pending U.S. Appl. No. 14/365,003.
U.S. Office Action dated Oct. 15, 2015 in co-pending U.S. Appl. No. 14/365,003.
U.S. Response dated Jan. 15, 2016 in co-pending U.S. Appl. No. 14/365,003.

* cited by examiner

METHOD FOR TRANSMITTING AT LEAST ONE MULTI-CARRIER SIGNAL CONSISTING OF OFDM-OQAM SYMBOLS

RELATED APPLICATIONS

This application is the U.S. National Phase of Application No. PCT/FR2012/052995 entitled "METHOD FOR TRANSMITTING AT LEAST ONE MULTI-CARRIER SIGNAL CONSISTING OF OFDM-OQAM SYMBOLS" filed Dec. 19, 2012, which designated the United States, and which claims the benefit of French Application No. 1162407 filed Dec. 23, 2011.

BACKGROUND OF THE INVENTION

The invention relates to the general field of telecommunications.

The invention relates more particularly to transmitting digital signals based on multicarrier modulation of the orthogonal frequency division multiplex-offset quadrature amplitude modulation (OFDM-OQAM) type in the context of systems having a number of transmit antennas N greater than or equal to 1 and a receive antenna. Such systems are also known as single-input single-output (SISO) systems in the presence of a single transmit antenna and a single receive antenna, or as multiple-input single-output (MISO) systems in the presence of a plurality of transmit antennas and a single receive antenna.

The invention can be applied to the field of wired communications (e.g. x digital subscriber line (xDSL), power line communication (PLC), optical fiber, etc.), or wireless communications (e.g. beyond third generation (B3G) systems, wireless local area network (WLAN) systems, etc.), for uplinks (terminal to an access point/base station) and/or for downlinks (access point/base station to terminal).

In known manner, the noise associated with the imperfections of communications systems and with the physical nature of the components used in such systems (such as the antennas, for example) affects the transmission of digital signals. Such signals are also subjected to deformation when they propagate between the transmit antenna (s) and the receive antenna (e.g. via an air channel). In the description below, the concept of a transmission or propagation channel between a transmit antenna and a receive antenna is used to cover not only the effects of the medium via which the digital signal propagates between the transmit antenna and the receive antenna (e.g. wireless channel or wired channel), but also the effects induced by the transmit and receive antennas on the digital signal.

The invention has a preferred but non-limiting application in the field of data transmission over so-called frequency selective transmission channels (multipath channels) with variations over time that are relatively slow.

In known manner, the frequency selectivity of a transmission channel is associated with the digital signal that is it desired to transmit over the channel: it is representative of the fact that the digital signal has frequency components that are attenuated differently by the transmission channel. In other words, this phenomenon appears when the bandwidth of the signal that is to be transmitted is much greater than the coherence bandwidth of the transmission channel, where the coherence bandwidth of a channel is defined as the minimum bandwidth at which two attenuations of the channels are independent. Compensating for the effects of the distortions introduced by multipath channels is then performed with the help of equalization techniques.

In this context, it is generally accepted that multicarrier transmission systems (or multicarrier modulation (MCM) systems), such as OFDM systems in particular, present numerous advantages. By transmitting data over a plurality of carrier frequencies in parallel (i.e. frequency multiplexing on a plurality of carrier frequencies also referred to as carriers or subcarriers), multicarrier transmission systems take the information that is for transmission at a high data rate and spread it over a large number of individual subbands that are modulated at low rates. This advantageously makes it possible to replace the step of equalizing a multipath channel, which may turn out to be complex in the time domain for single-carrier systems, with a step of performing equalization that is simple (having one coefficient per carrier) and that is performed in the frequency domain.

Orthogonal frequency division multiplexing (OFDM) is a multicarrier modulation technique that imposes a constraint of orthogonality between the subcarriers in order to limit interference between carriers (known as intercarrier interference (ICI)), while optimizing spectrum occupation. OFDM also benefits from implementation schemes that are simple and effective on the basis of inverse fast Fourier transforms (IFFTs) on transmission and of fast Fourier transforms (FFTs) on reception.

The constraint of orthogonality between the subcarriers is ensured by using a rectangular function ($\Pi$ gate function) for shaping the multicarrier channel. Adding redundancy in the form of a cyclic prefix (CP) or of a guard interval (e.g. made of zeros) at the output from the inverse fast Fourier transform also makes it possible to limit the distortion due to the interference introduced by the channel between symbols (known as intersymbol interference) (ISI)), and been carriers.

An OFDM signal $s_{CP-OFDM}[k]$ with a cyclic prefix (a CP-OFDM signal) in baseband, with discrete time, and with M subcarriers at an instant kTe, where Te designates the sampling period, is expressed by the following equation:

$$s_{CP-OFDM}[k] = \sum_{m=0}^{M-1} \sum_{n=-\infty}^{+\infty} c_{m,n} \Pi[k - n(M + L_{CP})] e^{j\frac{2\pi}{M}mk}$$

where $j^2=-1$, $\Pi$ designates a gate function of duration M, $c_{m,n}$ is a complex symbol (e.g. a symbol obtained by quadrature amplitude modulation (QAM)) transmitted over the carrier m at instant n, and $L_{CP}$ is the length of the cyclic prefix in number of samples.

Nevertheless, although adding a cyclic prefix (or a guard interval) of length $L_{CP}$ longer than the greatest length of the channel makes channel equalization easier by avoiding problems of ISI, it gives rise to a loss of spectrum efficiency that increases with increasing length of the cyclic prefix (or guard interval). The cyclic prefix or guard interval that is added does not convey any useful information in order to guarantee that the information that is received and processed on reception comes from a single multicarrier symbol.

In order to mitigate that drawback, it is known to make use of modulation of the orthogonal frequency division multiplexing/offset quadrature amplitude modulation (OFDM/OQAM) type. On each subcarrier, this modulation makes use of a complex QAM symbol $c_{m,n}$ being resolved (decomposed) into a pair of real symbols constituted by the real part $\Re(c_{m,n})$ and the imaginary part $\Im(c_{m,n})$ of the complex symbol $c_{m,n}$ applied to two half-symbol times. The real and imaginary parts of the complex symbols that are to be transmitted are also offset by one half-symbol time between two successive subcarriers. This decomposition into real symbols advantageously makes it possible to relax the constraint of orthogonality between the subcarriers to the domain of reals, thereby facilitating the design of orthogonal functions for shaping the multicarrier signal (also known as prototype functions or filters) that are thoroughly localized in terms of frequency and time.

The OFDM/OQAM signal $s_{OFDM-OQAM}[k]$ in baseband and in discrete time for M subcarriers at the instant kTe, where Te designates the sampling period, can thus be expressed in the following form:

$$s_{OFDM-OQAM}[k] = \sum_{m=0}^{M-1}\sum_{n=-\infty}^{+\infty} a_{m,n} \underbrace{f\left[k-n\frac{M}{2}\right]e^{j\frac{2\pi}{M}m(k-(LF-1)/2)}e^{j\phi_{m,n}}}_{f_{m,n}[k]}$$

where the coefficients $a_{m,n}$ are real coefficients (e.g. pulse amplitude modulation (PAM) symbols), f[ ] designates a prototype filter of length LF, and $\phi_{m,n}$ designates a phase term, e.g. selected to be equal to $$\frac{\pi}{2}(m+n).$$

Thus, the OFDM/OQAM modulation is freed from the presence of a guard interval or a cyclic prefix by a suitable selection of the prototype filter f modulating each subcarrier of the signal in such a manner as to ensure that each of these subcarriers is well localized in time and in frequency, and satisfying a real orthogonality constraint between the subcarriers that is expressed as follows:

$$\Re\{\langle f_{m,n}, f_{m',n'}\rangle\} = \Re\left\{\sum_{k=-\infty}^{+\infty} f_{m,n}[k]f^*_{m',n'}[k]\right\} = \delta_{m,m'}\delta_{n,n'}$$

where <g,h> designates the scalar product between g and h. The scalar product $\langle f_{m,n}, f_{m',n'}\rangle$ is thus a pure imaginary number for (m,n)≠(m',n'). For simplification purposes in the description below, the following notation is used:

$$\langle f\rangle_{m,n}^{p,q} = -j\langle f_{m,n}, f_{p,q}\rangle$$

By way of example, a known prototype filter that satisfies this constraint is the prototype filter obtained from the IOTA function as described in patent application FR 2 733 869, or the TFL1 prototype filter used in the document by C. Lélé et al. entitled "Channel estimation methods for preamble-based OFDM/OQAM modulations", European Wireless, April 2007 (given reference D1 in the description below).

Nevertheless, in spite of using a prototype filter that is well localized in time and in frequency, OFDM/OQAM modulation, by construction, produces an imaginary intrinsic interference term. Using conventional assumptions concerning the transmission model (channel invariant in a neighborhood $\Omega_{\Delta m,\Delta n}$ departing by no more than $\pm\Delta m$, $\pm\Delta n$ around each time-frequency point of coordinates (m,n), prototype filter f well localized in time and in frequency and shifted from the prototype filter that are invariant for a maximum delay of the channel equal to a determined number of samples), it is easy to show that for a SISO system, after transmission over a frequency selective channel with disturbance by additive noise written η, the demodulation signal can be written in the following form:

$$y_{m,n} = h_{m,n}(a_{m,n} + ja_{m,n}^{(i)}) + J_{m,n} + \eta_{m,n}$$

where:
$h_{m,n}$ designates the value of the complex channel on the subcarrier m at instant n;
$\eta_{m,n}$ designates the noise component at instant n on the subcarrier m;
$ja_{m,n}^{(i)}$ designates a purely imaginary intrinsic interference term affecting the symbol $a_{m,n}$ and depending on its neighboring symbols at the instant n as given by:

$$a_{m,n}^{(i)} = \sum_{(p,q)\in\Omega_{\Delta m,\Delta n}-(0,0)} a_{m+p,n+p}\langle f\rangle_{p,q}^{m,n}$$

with $\langle f\rangle_{m,n}^{p,q} = -j\langle f_{m,n}, f_{p,q}\rangle$ ; and
$J_{m,n}$ designates an interference term created by symbols situated outside the neighborhood of the symbol $a_{m,n}$.

Calculation of the interference terms is described in greater detail in document D1 and is not repeated herein.

If firstly the prototype filter f is well localized in frequency and in time, and if secondly the channel is not exclusively frequency selective and/or the signal-to-noise ratio is not too great, the term $J_{m,n}$ can be ignored compared with the noise term $\eta_{m,n}$. It should be observed that this approximation is appropriate in a large number of scenarios that are to be encountered in practice. The demodulated signal can then be approximated as follows:

$$y_{m,n} \approx h_{m,n}(a_{m,n} + ja_{m,n}^{(i)}) + \eta_{m,n}$$

Starting from this approximation, various techniques can then be envisaged on transmission and on reception for eliminating the intrinsic interference term $a_{m,n}^{(i)}$ for a SISO system. By way of example, one such technique, mentioned in document D1, consists in using a ZF equalizer on reception having one coefficient per carrier applied to the real part of the demodulated signal $y_{m,n}$.

Nevertheless, although those techniques are effective for a SISO system (i.e. a system with a single transmit antenna and a single receive antenna), they are not easily transposable to a multiantenna system of the MISO type, and in particular to a system making use of space-time coding, such as for example the orthogonal coding scheme of coding rate 1 defined for two transmit antennas in the document by S. Alamouti entitled "A simple transmit diversity technique for wireless communications", IEEE Journal of Selected Areas Communication, 1988, No. 16, pp. 1451-1458.

The space-time coding scheme produced by Alamouti corresponds to an open loop coding system in which two successive complex symbols s1 and s2 are transmitted over two transmit antennas in compliance with the following code matrix:

$$G2 = \overset{antennas\ \downarrow, time\rightarrow}{\begin{bmatrix} s1 & -s2^* \\ s2 & s1^* \end{bmatrix}}$$

where s* designates the complex conjugate of the symbol s. The rows of the matrix G2 give the symbols transmitted over the various transmit antennas: thus, the symbols s1 and then −s2* are transmitted over the first antenna, while the symbols s2 and s1* are transmitted over the second antenna.

The coding matrix G2 is a complex orthogonal matrix, i.e. $G2\,G2^H = I$, where I designates the identity matrix of dimensions 2×2 and $^H$ designates the Hermetian operator. Thus, the coding scheme proposed by Alamouti advantageously offers a coding rate of 1 while ensuring on reception that the symbols transmitted over each antenna are decoupled, thus making it possible to use simple linear decoding with maximum likelihood.

Applying the Alamouti coding scheme to OFDM modulation leads to the coding matrix GC2 being rewritten, e.g. in the following form:

$$GC2 = \begin{bmatrix} c_{m,n} & -c^*_{m,n+1} \\ c_{m,n+1} & c^*_{m,n} \end{bmatrix}$$

where $c_{m,n}$ designates the complex symbol transmitted at an instant n on a subcarrier m.

A similar coding scheme can also be defined for modulation of OFDM-OQAM type, taking account of the fact that, as mentioned above, OFDM-OQAM modulation resolves each complex symbol $c_{m,n}$ into a pair of real symbols ($\Re(c_{m,n})$ and $\Im(c_{m,n})$) that are spaced apart on the same subcarrier by a half symbol time T/2 (where T designates the duration of a complex symbol), and that are also offset by a half-symbol time between two consecutive subcarriers. Using the notation $a_{m,2n+k,i}$ for the real symbols transmitted over the carrier m at four successive instants $(2n+k)T/2$, $k=0, \ldots, 3$, over antenna i, $i=0,1$, it is possible to define the following orthogonal coding scheme:

$a_{m,2n,0} = \Re(c_{m,2n})$ $a_{m,2n,1} = \Re(c_{m,2n+1})$ $a_{m,2n+1,0} = \Im(c_{m,2n})$ $a_{m,2n+1,1} = \Im(c_{m,2n+1})$ $a_{m,2n+2,0} = -\Re((c_{m,2n+1})^*) = -\Re(c_{m,2n+1}) = a_{m,2n,1}$ $a_{m,2n+2,1} = \Re((c_{m,2n})^*) = \Re(c_{m,2n}) = a_{m,2n,0}$ $a_{m,2n+3,0} = \Im((c_{m,2n+1})^*) = \Im(c_{m,2n+1}) = a_{m,2n+1,1}$ $a_{m,2n+3,1} = \Im(c_{m,2n})) = -\Im(c_{m,2n}) = a_{m,2n+1,0}$

In similar manner, for SISO, if $h_{m,n,i}$ designates the gain of the complex channel between the transmit antenna i and the receive antenna for the subcarrier m at instant nT/2, and if it is assumed that this gain is constant between the instants 2nT/2 and (2n+3)T/2, then the signal received on the receive antenna for the subcarrier m is given by:

$y_{m,2n} = h_{m,2n,0}(a_{m,2n,0} + ja_{m,2n,0}^{(i)}) + h_{m,2n,1}(a_{m,2n,1} + ja_{m,2n,1}^{(i)}) + n_{m,2n,0}$, $y_{m,2n+1} = h_{m,2n,0}(a_{m,2n+1,0} + ja_{m,2n+1,0}^{(i)}) + h_{m,2n,1}(a_{m,2n+1,1} + ja_{m,2n+1,1}^{(i)}) + n_{m,2n+1,1}$, $y_{m,2n+2} = h_{m,2n,0}(a_{m,2n+2,0} + ja_{m,2n+2,0}^{(i)}) + h_{m,2n,1}(a_{m,2n+2,1} + ja_{m,2n+2,1}^{(i)}) + n_{m,2n+2,0}$, $y_{m,2n+3} = h_{m,2n,0}(a_{m,2n+3,0} + ja_{m,2n+3,0}^{(i)}) + h_{m,2n,1}(a_{m,2n+3,1} + ja_{m,2n+3,1}^{(i)}) + n_{m,2n+3,1}$, where $a_{m,n,i}^{(i)}$ designates the intrinsic interference affecting the real symbol $a_{m,n,i}$ depending on its neighboring symbols at instant n.

By writing:

$z_{m,2n} = y_{m,2n} + jy_{m,2n+1}$ and $z_{m,2n+1} = y_{m,2n+2} + jy_{m,2n+3}$ the following expression can be obtained from the above equations after performing a few calculations that are described in greater detail in document D1:

$$\begin{bmatrix} z_{m,2n} \\ (z_{m,2n+1})^* \end{bmatrix}_{\underline{z_{2n}}} = \underbrace{\begin{bmatrix} h_{m,2n,0} & h_{m,2n,1} \\ h^*_{m,2n,1} & -h^*_{m,2n,0} \end{bmatrix}}_{Q_{2n}} \underbrace{\begin{bmatrix} c_{m,2n} \\ c_{m,2n+1} \end{bmatrix}}_{c_{2n}} +$$

$$\underbrace{\begin{bmatrix} h_{m,2n,0} & h_{m,2n,1} & 0 & 0 \\ 0 & 0 & h^*_{m,2n,1} & -h^*_{m,2n,0} \end{bmatrix}}_{K_{2n}} \underbrace{\begin{bmatrix} x_{m,2n,0} \\ x_{m,2n,1} \\ x_{m,2n+2,0} \\ x_{m,2n+2,0} \end{bmatrix}}_{x_{2n}} + \underbrace{\begin{bmatrix} \mu_{m,2n} \\ \mu^*_{m,2n+1} \end{bmatrix}}_{\mu_{2n}}$$

where:
- the matrix $Q_{2n}$ is an orthogonal matrix;
- $\mu_{2n}$ is a noise component; and
- $x_{2n}$ is a vector with components that are linear combinations of intrinsic interference terms.

This expression shows that unlike the SISO situation, in a MISO system using Alamouti type coding, the signal received on the receive antenna presents an intrinsic interference term $K_{2n}x_{2n}$ that, even in the absence of noise, is difficult to eliminate.

Solutions exist in the represent state of the art for remedying this drawback. Nevertheless, most of them require either complex reception schemes to be implemented, or else the addition of a cyclic prefix, thereby giving rise to a loss of spectrum efficiency.

There therefore exists a need for an OFDM-OQAM type transmission scheme that does not lead to a loss of spectrum efficiency and that can be used in the context of a SISO system or a MISO system without requiring complex reception algorithms to be performed.

OBJECT AND SUMMARY OF THE INVENTION

The invention satisfies this need in particular by proposing a transmission method for transmitting at least one OFDM-OQAM type multicarrier signal to a receive antenna of a receiver device, the method being for performing by a transmitter device having at least one transmit antenna, the method comprising, for each transmit antenna of the transmitter device:
- a step of filtering OFDM-OQAM symbols associated with the transmit antenna by means of a time-reversal prefilter defined from an estimate of the transmission channel between the transmit antenna and the receive antenna; and
- a step of transmitting the filtered OFDM-OQAM symbols via the transmit antenna over the transmission channel.

More precisely, if the transmission channel between the transmit antenna under consideration and the receive antenna is modeled by a linear filter having a finite impulse response h(t) (a conventional assumption for modeling a multicarrier channel), and if $\hat{h}(t)$ designates an estimate of the response of the transmission channel, then the time-reversal prefilter applied during the filtering step is a matched filter having the impulse response $\hat{h}^*(-t)$. In equivalent manner, if H(z) designates the z transform of the discrete version of the transmission channel, and $\hat{H}(z)$ designates the z transform of the estimate of the transmission channel, then the time-reversal prefilter applied during the filtering step has its z transform given by $\hat{H}^*(z^{-1})$.

Correspondingly, the invention also provides a transmitter device having at least one transmit antenna and suitable for transmitting at least one OFDM-OQAM type multicarrier signal to a receive antenna of a receiver device, the transmitter device comprising in association with each transmit antenna:

means for filtering OFDM-OQAM symbols associated with that transmit antenna, the means comprising a time-reversal prefilter defined on the basis of an estimate of a transmission channel between the transmit antenna and the receive antenna; and means for transmitting the filtered OFDM-OQAM symbols via the transmit antenna over the transmission channel.

The invention thus provides a novel scheme for transmitting an OFDM-OQAM type multicarrier signal operating in a closed loop and using an estimate of the transmission channel between the transmit antenna(s) and the receive antenna. The estimation may be performed for example at the receiver device and returned to the transmitter device via a return channel.

More precisely, the invention proposes transmitting OFDM-OQAM symbols associated with a transmit antenna of the transmitter device over an equivalent channel resulting from convolution of the time-reversal prefilter with the transmission channel corresponding to said transmit antenna.

Assuming that the estimate of the channel at the transmitter device is perfect, it can easily be shown that the equivalent channel is a symmetrical conjugate channel with a frequency response that is real. This has the consequence that the real orthogonality constraint on the subcarriers that is satisfied by the prototype filter advantageously continues to be satisfied after passing via the equivalent channel, since its frequency response is real, even if the transmission channel associated with each antenna is complex.

This avoids generating a purely imaginary intrinsic interference term that is difficult to eliminate, such as the term generated for prior art OFDM-OQAM modulation. The invention therefore does not require, a fortiori, the use of reception schemes that are complex in order to eliminate this interference, and on the contrary it is possible to make use of conventional linear reception schemes.

It should be observed that the equivalent channel has a spread of delays that is greater than that of the complex transmission channel h(t). Nevertheless, this delay does not harm the performance of the OFDM-OQAM modulation since the power profile of the equivalent channel is also more "concentrated" around its central coefficient in the sense that the central coefficient has a larger real amplitude (equal to the sum of the amplitudes squared of each path) and the coefficients associated with the multiple paths are attenuated more strongly than the transmission channel between the transmit antenna under consideration and the receive antenna. In addition, the solution proposed by the invention does not require a cyclic prefix or a guard interval to be added, so this spreading of delays has no impact properly speaking on the spectrum efficiency of the transmission scheme.

The transmission scheme proposed by the invention can advantageously be used in the context of a SISO or a MISO communications system, and in particular a MISO communications system using space-time or space-frequency type coding.

Thus, in a particular implementation in which the transmitter device has a number N of transmit antennas greater than 1, the transmission method of the invention further comprises a coding step during which coding is applied to real value symbols, the coding being defined by a determined real coding matrix generating N coded symbol sequences associated with said N transmit antennas, a coded symbol of a coded symbol sequence associated with a transmit antenna modulating a carrier of the OFDM-OQAM symbol associated with that antenna.

Preferably, the coding matrix is a real orthogonal matrix. Nevertheless, the invention also applies to a non-orthogonal coding matrix.

By way of example, the coding applied during the coding step may be space-time coding enabling the real value symbols to be coded in a space dimension and in a time dimension (i.e. over a plurality of transmit antennas and distributed over a plurality of symbol times).

In a variant, the coding applied during the coding step is space-frequency coding serving to code the real value symbols in a space dimension and in a frequency dimension (i.e. over a plurality of transmit antennas and over a plurality of OFDM modulation subcarriers).

Preferably, the coding applied has a coding rate of 1, so as to maximize spectrum efficiency. Nevertheless, the invention also applies to coding at lower rates.

In other words, by combining OFDM-OQAM modulation and the principle of time reversal, the invention advantageously makes it possible to use real space-time or space-frequency codes, and to do so without loss of information since the equivalent channel is a real channel. The use of an orthogonal space-time or space-frequency code in the transmission scheme also makes it possible to benefit from the diversity made available by the presence of multiple transmit antennas, while also ensuring that the multicarrier signal resulting from the combination of the signals received from these multiple antennas is simple to demodulate.

Real orthogonal space-time (or space-frequency) codes are known to exist that have the maximum code rate (i.e. a rate of 1), regardless of the number of transmit antennas under consideration. In contrast, complex orthogonal space-time (or space-frequency) codes having a coding rate of 1 exist only when the number of transmit antennas is equal to two.

The invention thus makes it possible to use an orthogonal space-time or space-frequency code of maximum coding rate regardless of the number of transmit antennas of the transmitter device.

It should be observed that the combination of an orthogonal real space-time or space-frequency code with OFDM-OQAM modulation and the principle of time reversal as proposed by the invention is not the result of an operation that is obvious to the person skilled in the art. It assumes very accurate knowledge and astute consideration of the conditions that are required for orthogonality and that are associated with three distinct domains associated respectively with OFDM-OQAM modulation, with space-time/space-frequency coding, and with time reversal.

In a particular implementation, the various steps of the transmission method are determined by computer program instructions.

Consequently, the invention also provides a computer program on a data medium, the program being suitable for being implemented in a transmitter device or more generally in a computer, the program including instructions adapted to performing steps of a transmission method as described above.

The program may use any programming language, and be in the form of source code, object code, or code intermediate between source code and object code, such as in a partially compiled form, or in any other desirable form.

The invention also provides a computer readable data medium including instructions of a computer program as specified above.

The data medium may be any entity or device capable of storing the program. For example, the medium may comprise storage means, such as a read only memory (ROM), e.g. a compact disk (CD) ROM, or a microelectronic circuit ROM, or indeed magnetic recording means, e.g. a floppy disk or a hard disk.

Furthermore, the data medium may be a transmissible medium such as an electrical or optical signal, that may be conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

In another aspect, the invention also provides a reception method for receiving an OFDM-OQAM type multicarrier signal, referred to as a received multicarrier signal, which method is performed by a receiver device having a receive antenna, the received multicarrier signal resulting from at least one OFDM-OQAM type multicarrier signal being transmitted over a propagation channel in accordance with a transmission method of the invention by means of a transmitter device having at least one transmit antenna, the reception method including a step of performing OFDM-OQAM demodulation of the received multicarrier signal.

Correspondingly, the invention also provides a receiver device suitable for receiving an OFDM-OQAM type multicarrier signal, referred to as a received multicarrier signal, the receiver device having a receive antenna, the received multicarrier signal being the result of at least one OFDM-OQAM type multicarrier signal being transmitted over a propagation channel by a transmitter device having at least one transmit antenna and in accordance with the invention, the receiver device including an OFDM-OQAM demodulator suitable for demodulating received multicarrier signals.

In another aspect, the invention also provides a communication method of transmitting at least one OFDM-OQAM type multicarrier signal performed by a communications system comprising a transmitter device having at least one transmit antenna and a receiver device having a receive antenna, the method comprising:
  said transmitter device transmitting said at least one multicarrier signal in accordance with the transmission method of the invention; and
  the receiver device receiving said at least one multicarrier signal via its receive antenna in accordance with the reception method of the invention.

Correspondingly, the invention also provides a communications system comprising:
  a transmitter device in accordance with the invention having at least one transmit antenna and suitable for transmitting at least one multicarrier signal over said at least one transmit antenna; and
  a receiver device according to the invention including a receive antenna and suitable for receiving said at least one multicarrier signal over said receive antenna.

It should be observed that if the transmitter device has a plurality of transmit antennas, a plurality of multicarrier signals are transmitted by these transmit antennas respectively such that the receiver device receives a combination of these multicarrier signals via its receive antenna, and demodulates this combination of signals.

In another aspect, the invention also provides a signal made up of at least one OFDM-OQAM type multicarrier signal transmitted by a transmitter device including at least one transmit antenna in accordance with the transmission method of the invention.

The communication method, the communications system, and the signal of the invention have the same advantages as those mentioned above for the transmission method and the transmitter device of the invention.

In other implementations and embodiments, it is also possible to envisage that the transmission method, the communication method, the transmitter device, and the communications system of the invention present in combination all or some of the above-specified characteristics.

BRIEF DESCRIPTION OF THE DRAWINGS

Other characteristics and advantages of the present invention appear from the following description made with reference to the accompanying drawings that show an embodiment having no limiting character. In the figures.

DETAILED DESCRIPTION OF THE INVENTION

As mentioned above, the invention advantageously proposes a novel multicarrier signal transmission scheme of the OFDM-OQAM type suitable for use in a SISO or MISO system and operating in a closed loop on the basis of knowledge about the transmission channel (or propagation channel). This new scheme is shown in FIG. 1.

The notion of a transmission channel between a transmit antenna and a receive antenna in the meaning of the invention includes the effects of the propagation channel proper between the transmit antenna and the receive antenna, and also the contributions of the transmit antenna and of the receive antenna. It should be observed that in a multiple-input and single-output system (i.e. having a plurality of transmit antennas and a single receive antenna), there are as many transmission channels as there are (transmit antenna, receive antenna) pairs, or in other words as many as there are transmit antennas.

More precisely, the general principle of the invention relies on applying a technique of time reversing the transmission channel (between each transmit antenna and the receive antenna) to multicarrier modulation of the OFDM-OQAM type.

Figure 1:
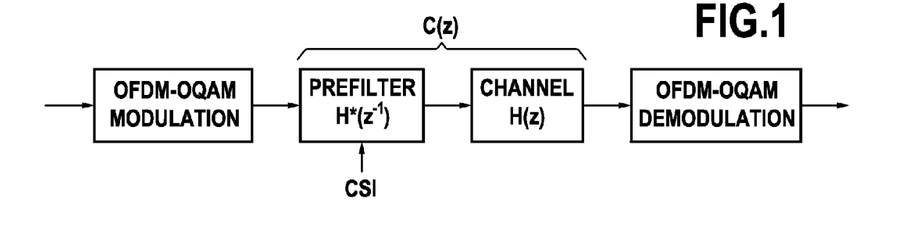
FIG. 1 is a diagram of the new transmission scheme proposed by the invention.

In other words, and with reference to FIG. 1, the OFDM-OQAM symbols are convoluted prior to being transmitted via the transmit antenna over the transmission channel by a time-reversal prefilter (i.e. a matched filter) of coefficients that are obtained by time reversal of the coefficients of the transmission channel (or more precisely of an estimate of the transmission channel).

It is assumed that the transmission channel is a frequency-selective channel made up of L paths, and modeled by a linear filter having complex coefficients $h_0, h_1, \ldots, h_{L-1}$. The vector of complex coefficients of the channel is written $h=(h_0, h_1, \ldots, h_{L-1})$. In the description below, the transmission channel is designated and specified either by the channel coefficients, or by its time impulse response, or by its z transform, these various representations being equivalent. The same applies for the time-reversal prefilter.

The coefficients $h_l$, $l=0, \ldots, L-1$ are complex coefficients in which the imaginary part and the real part are distributed in compliance with a centered normal distribution, and the norm $\|h_l\|$ follows a Rayleigh distribution. The z transform, written $H(z)$, of the impulse response $h(t)$ of the transmission channel is expressed in the following form:

$$H(z) = \sum_{\ell=0}^{L-1} h_\ell z^{-\ell}$$

In known manner, the time reversal of the transmission channel has the transform $H^*(z^{-1})$ and its impulse response is $h^*(-t)$. It is also defined by the complex coefficient vector $h^{RT}=(h^*_{L-1}, h^*_{L-2}, \ldots, h^*_0)$.

The estimated coefficient vector for the channels is written as follows $\hat{h}=(\hat{h}_0, \hat{h}_1, \ldots, \hat{h}_{L-1})$. Assuming that the channel estimate is ideal (i.e. that the channel coefficients are accurately estimated, i.e. $\hat{h}=h$, or in equivalent manner $\hat{h}_i=h_i$ for $i=0, \ldots, L-1$), the time-reversal prefilter has the following z transform:

$$\hat{H}^*(z^{-1})H^*(z^{-1}) = \sum_{\ell=0}^{L-1} h^*_\ell z^\ell$$

The equivalent channel seen by the OFDM-OQAM modulation is thus as follows:

$$C(z) = H(z)H^*(z^{-1}) = \sum_{\ell,k=0}^{L-1} h_\ell h^*_k z^{-(\ell-k)}$$

which can also be written in the following form:

$$C(z) = \underbrace{\sum_{\ell=0}^{L-1} \|h_\ell\|^2}_{c_0} + \sum_{k\neq \ell} (h_k h^*_\ell z^{-(k-\ell)} + h^*_k h_\ell z^{(k-\ell)})$$

or in frequency terms, writing $z=\exp(jq)$:

$$C(\exp(jw)) = \underbrace{\sum_{\ell=0}^{L-1} \|h_\ell\|^2}_{c_0} + 2\sum_{k\neq \ell} (\Re(h_k h^*_\ell)\cos(k-\ell)w) - \Im(h^*_k h_\ell)\sin((k-\ell)w))$$

The equivalent channel is thus a symmetrical conjugate channel in which the central part $c_0$ is a real coefficient that follows a $\chi^2$ distribution with 2L degrees of freedom (the other coefficients having a normal distribution). From the above equations, it can also be seen that because of the symmetry of the coefficients of the equivalent channel, its transform $C(z)$ is a real function. It should be observed that this reasoning is valid regardless of whether the channel is represented discretely or continuously.

In other words, in accordance with the invention, the symbols from the OFDM-OQAM modulator, which carry symbols with real values, are subsequently transmitted over a real equivalent channel $C(z)$ obtained by convolution of the time-reversal prefilter and of the transmission channel. As a result, the constraint of real orthogonality on the carrier frequencies that is true for the prototype filter of the OFDM-OQAM modulator remains true after passing via this equivalent channel. In other words, no imaginary interference term intrinsic to the OQAM modulation is created as a result of propagation in the channel $H(z)$. The invention thus astutely combines the various orthogonality constraints associated with distinct domains, namely with OFDM-OQAM modulation, time reversal, and, if using MISO, with space-time coding or with space-frequency coding.

With reference to FIGS. 2 to 5, there follows a description of two particular implementations of the invention in which the principle of time reversal is applied in accordance with the invention to OFDM-OQAM modulation, both in the context of a SISO system and in the context of a MISO system.

Figure 2:
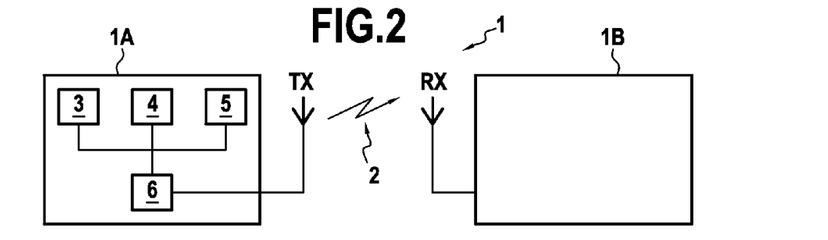
FIG. 2 shows a transmitter device, a receiver device, and a SISO communications system in accordance with the invention in a first embodiment.

FIG. 2 shows a communications system 1 in accordance with the invention, in a first embodiment.

The communications system 1 is a SISO system having a transmit antenna TX and a receive antenna RX. In accordance with the invention, it comprises:

a transmitter device 1A in accordance with the invention; and a receiver device 1B in accordance with the invention.

The transmitter and receiver devices 1A and 1B are separated by a transmission channel 2 that is assumed in this example to be frequency selective and made up of L complex paths distributed in a normal distribution. The complex coefficients of the transmission channel 2 are written $h=(h_0, h_1, \ldots, h_{L-1})$.

In this example, the transmitter device 1A has the hardware architecture of a computer. In particular, it comprises a control unit 3 having a processor, a random access memory (RAM) 4, a ROM 5, and communications means 6 including the transmit antenna TX. The communications means 6 are controlled by the control unit 3 to transmit digital signals (such as a multicarrier signal) over the transmit antenna TX, and in this example they also include a receive antenna (not shown) enabling the transmitter device 1A to receive signals, e.g. signals coming from the receiver device 1B and containing an estimate of the transmission channel between the transmit antenna TX and the receive antenna RX.

The ROM 5 of the transmitter device 1A constitutes a storage medium in accordance with the invention that is readable by the processor of the control unit 3 and that stores a computer program in accordance with the invention having instructions for executing steps of a multicarrier signal transmission method in accordance with the invention, as described below with reference to FIG. 3 in a particular variant implementation.

In similar manner, the receiver device 1B in this example has the hardware architecture of a computer. In particular, it comprises a control unit having a processor, a RAM, a ROM, and communications means including the receive antenna RX. The communications means are controlled by the control unit to receive digital signals (such as the multicarrier signal) via the receive antenna RX, and in this example they also include a transmit antenna enabling the receiver device 1B to send signals, e.g. such as signals to the transmitter device 1A containing an estimate of the transmission channel between the transmit antenna TX and the receive antenna RX.

The ROM of the receiver device constitutes a storage medium in accordance with the invention that is readable by the processor of the control unit and that stores a computer program in accordance with the invention including instructions for executing steps of a multicarrier signal reception method in accordance with the invention, as described below with reference to FIG. 3 in a particular variant implementation.

Figure 3:
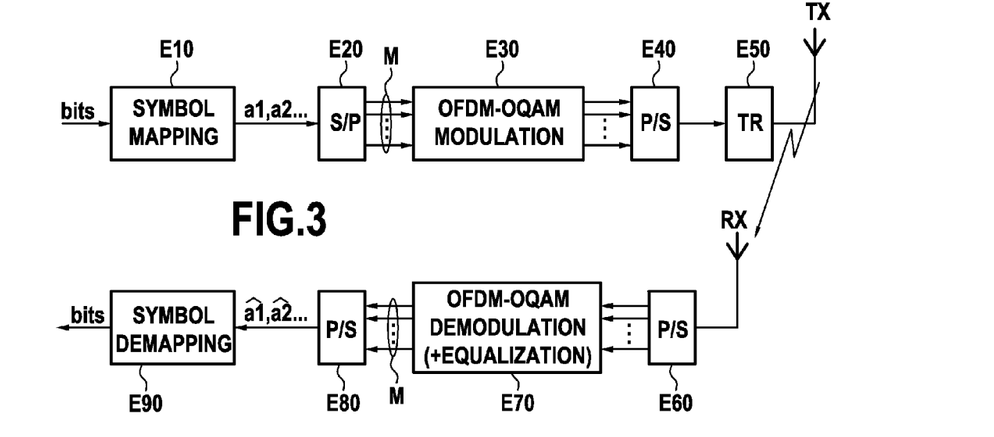
FIG. 3 shows the main steps of a transmission method, a reception method, and a communication method in accordance with the invention in a first implementation in which they are performed respectively by the transmitter device, by the receiver device, and by the SISO communications system of FIG. 2.

FIG. 3 shows the main steps of the method of transmitting at least one multicarrier signal, of a method of receiving a multicarrier signal, and of a communications method of the invention as performed respectively in the first embodiment by the transmitter device 1A, by the receiver device 1B, and by the communications system 1 of FIG. 2.

In this first embodiment, a sequence of bits is transformed into a run of real-value symbols $(a_1, a_2, \ldots)$ in a phase and amplitude modulation (PAM) type constellation (step E10), in known manner. The invention applies to any type of OQAM modulation, and the PAM constellation may be of any order, and indeed the constellation used may be a constellation other than a PAM constellation, for example it may be a phase-shift keying (PSK) constellation.

The bits of the sequence of bits may also be bits coded using an error-correcting code such as a turbocode or a convolutional code, and/or may have been subjected to time interleaving prior to transformation into PAM symbols.

The real PAM symbols (also referred to as real value PAM symbols) are then distributed over M subcarriers via a series-to-parallel conversion step (step E20) so as to form OFDM-OQAM symbols in the frequency domain. The real PAM symbol associated with the $m^{th}$ subcarrier at instant $nT/2$ is written $a_{m,n}$, where T designates the duration of one complex symbol.

The real symbols $a_{m,n}$ distributed over the M subcarriers are then modulated using an OFDM-OQAM modulation scheme (i.e. each real symbol $a_{m,n}$ modulates a subcarrier m of the signal), in particular with the help of an inverse fast Fourier transform IFFT and a prototype filter F (step E30) in known manner that is not described in detail herein.

The discrete OFDM/OQAM multicarrier signal s[k] in baseband can be written in the following form (after parallel-to-series conversion in step E40):

$$s[k] = \sum_{m=0}^{M-1} \sum_{n=-\infty}^{+\infty} a_{m,n} \underbrace{f\left[k - n\frac{M}{2}\right] e^{j\frac{2\pi}{M}m\left(k-\frac{(LF-1)}{2}\right)}}_{f_{m,n}[k]} e^{j\phi_{m,n}}$$

In the presently-described example $$\phi_{m,n} = \frac{\pi}{2}(m+n).$$

This phase serves to guarantee a quadrature rule between two symbols that are adjacent not only in time but also in frequency (i.e. on two adjacent carriers). In a variant, it is possible to use other phase values that guarantee this rule, such as for example $$\phi_{m,n} = \frac{\pi}{2}(m+n) + \phi_0,$$

where $\phi_0$ is arbitrary.

The prototype filter F is a filter of length LF satisfying a real orthogonality constraint between the subcarriers, given by:

$$\Re\{\langle f_{m,n}, f_{m',n'}\rangle\} = \Re\left\{\sum_{k=-\infty}^{+\infty} f_{m,n}[k]f_{m',n'}^*[k]\right\} = \delta_{m,m'}\delta_{n,n'}$$

In other words $<f_{m,n},f_{m',n'}>$ is purely imaginary for $(m,n) \neq (m',n')$.

Various known prototype filters satisfy such a condition and can be used in the context of the invention, such as in particular an IOTA prototype filter or the TFL1 filter as described in document D1.

In accordance with the invention, the OFDM-OQAM symbols forming the multicarrier signal s are then filtered by a time-reversal prefilter TR (i.e. a matched filter) (step E50), defined from an estimate of the transmission channel 2. More precisely, the impulse response (or in equivalent manner the coefficients) of the prefilter TR is obtained on the basis of the estimate $\hat{h}(t)$ of the impulse response (or of the coefficients) of the transmission channel 2 as reversed in time and conjugated.

In other words, the vector $h^{TR}$ of the coefficients of the time-reversal prefilter TR are given by:

$$h^{TR} = (\hat{h}^*_{L-1}, \hat{h}^*_{L-2}, \ldots, \hat{h}^*_0)$$

where $\hat{h} = (\hat{h}_0, \hat{h}_1, \ldots, \hat{h}_{L-1})$ designates the estimated coefficients of the transmission channel. It is possible to normalize the coefficients of the time-reversal prefilter in order to avoid modifying the transmission power of the multicarrier signal.

The multicarrier signal resulting from this filtering step is written x, where:

$$x = s \otimes h^{TR}$$

where $\otimes$ designates the convolution operator.

Thus, by definition of the prefilter TR, it is necessary to have knowledge at the transmitter device 1A about the coefficients of the propagation channel 2, in other words it is necessary to have an estimate of the coefficients $h = (h_0, h_1, \ldots, h_{L-1})$ of the propagation channel 2.

Various channel estimation techniques may be used for estimating the propagation channel 2, such as for example the techniques of making an estimate by means of a preamble, as described for OFDM/OQAM modulation in document D1.

In the presently-described example, it is assumed that this estimate is made at the receiver device 1B and is then returned over a return channel from the receiver device 1B to the transmitter device 1A. This type of operation is conventionally used in frequency-division duplex (FDD) systems operating in a closed loop.

In a variant, for certain communications systems such as systems using duplex transmission of the time-division duplex (TDD) type, it is generally accepted that there is propagation channel reciprocity between the up link and the down link. For such systems, a channel estimate made by the transmitter on the basis of a signal received from the receiver can then be used for determining the coefficients of the time-reversal prefilter TR.

The filtered OFDM-OQAM symbols of the multicarrier signal x are then transmitted over the transmission channel 2 via the transmit antenna TX. The multicarrier signal x is a signal in accordance with the invention.

The multicarrier signal received by the receive antenna RX of the receiver device 1B and after propagation of the signal x in the channel 2 is written y.

The received multicarrier signal y is then demodulated in conventional manner as known to the person skilled in the art using the following steps of the reception method of the invention as performed by the receiver device 1B:

- series-to-parallel conversion E60 (inverse of step E40);
- OFDM/OQAM demodulation E70 using a Fourier transform and one equalizer ZF per carrier having a single coefficient given by $\Sigma_{l=0}^{L-1}\|\tilde{h}_l\|^2$ (naturally it is possible to envisage using other equalizers, such as for example an equalizer using a minimum mean square error (MMSE) criterion);
- parallel-to-series conversion E80 of the demodulated real value symbols $\hat{a}_{m,n}$, m=1, . . . , M on the M subcarriers (inverse of step E20); and
- symbol-to-bit conversion E90 in compliance with the constellation selected on transmission and applied in step E10. Deinterleaving and decoding of the bits may then be performed if the bits processed in step E10 were bits that had already been coded and interleaved, by using an operation that is the inverse of that performed on transmission.

As mentioned above, the transmission method of the invention advantageously makes it possible to eliminate the imaginary intrinsic interference term generated by using OFDM/OQAM modulation.

By using calculations similar to those described in document D1 as applied to the context of the invention to the equivalent channel written $H^R$ obtained by convolution of $h^{TR}$ and h, and assuming that the channel estimate available at the transmitter device 1A is perfect, it can be shown that the demodulated signal for the $m^{th}$ subcarrier at instant n may be written in the following form:

$$y_{m,n} = H_{m,n}^R a_{m,n} + jI_{m,n} \eta_{m,n}$$

where $H_{m,n}^R$ designates the real coefficient of the equivalent channel $H^R$ at the time-frequency position (m,n) and:

$$I_{m,n} = \sum_{\substack{p,q, \\ (p,q)\neq(0,0)}} a_{m+p,n+q} H_{m+p,n+q}^R \langle f \rangle_{m+p,n-q}^{m,n}$$

$I_{m,n}$ is thus a real quantity (unlike the above-described interference $J_{m,n}$ for OFDM-OQAM without time reversal), and it can easily be eliminated by taking into consideration only the real portion of the signal $y_{m,n}$. Simple equalization of ZF type with one coefficient per subcarrier then suffices to obtain an estimate $\hat{a}_{m,n}$ of the symbols $a_{m,n}$ transmitted by the transmitter device 1A, i.e.:

$$\hat{a}_{m,n} = a_{m,n} + \Re(\eta_{m,n})$$

It can thus readily be understood that by using a time-reversal prefilter of the propagation channel, the invention provides a transmission scheme that does not suffer from loss of spectrum efficiency while preserving a reception scheme that is simple.

It is also possible to apply this same principle to a system having a plurality of transmit antennas and a single receive antenna (a MISO system).

A second embodiment is thus described below with reference to FIGS. 4 and 5 in which the time-reversal principle is applied in accordance with the invention to OFDM-OQAM modulation in the context of a MISO system using a real orthogonal space-time code with a coding rate of 1. The coding rate of a space-time (or space-frequency) code applied to N transmit antennas is defined as the ratio of the number of useful symbols over the number of symbol durations needed to transmit them.

Figure 4:
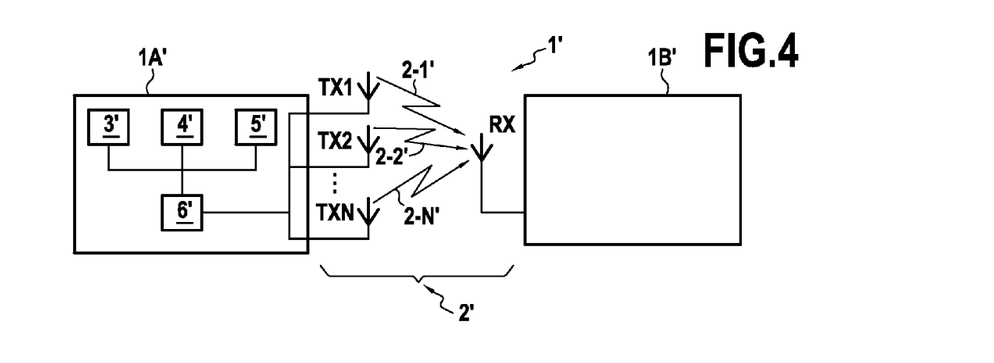
FIG. 4 shows a transmitter device, a receiver device, and a MISO communications system in accordance with the invention in a second embodiment.

FIG. 4 shows a MISO communications system 1' in accordance with the invention in a second embodiment.

In accordance with the invention, the communications system 1' comprises:

- a transmitter device 1A' in accordance with the invention and having N transmit antennas TX1, TX2, . . . , TXN; and
- a receiver device 1B' in accordance with the invention and fitted with a single receive antenna RX.

The transmitter and receiver devices 1A' and 1B' are separated by a transmission channel 2' made up of N subchannels (or channels) 2_1', 2_2', 2_N'. More precisely, in the context of a MISO system, each transmit antenna TXj, j=1, . . . , N of the transmitter device 1A' is separated from the receive antenna RX of the receiver device 1B' by a transmission channel 2_1', 2_2', . . . , 2_N, each channel 2_n' being assumed in this example to be frequency selective and made up of respectively of Lj, j=1, . . . , N complex paths distributed in a normal distribution. The complex coefficients of the propagation channel 2_j', j=1, . . . , N are written:

$$h^{(j)} = (h_0^{(j)}, h_1^{(j)}, \ldots, h_{Lj-1}^{(j)})$$

For simplification purposes, it is also assumed that L1=L2= . . . =LN=L. Nevertheless, the invention is also applicable for lengths Lj, j=1, . . . , N that are different.

In this example, the transmitter device 1A' has the hardware architecture of a computer. In particular, it comprises a control unit 3' with a processor, a RAM 4', a ROM 5', and communications means 6' including the transmit antennas TX1, TX2, . . . , TXN. The communications means 6' are controlled by the control unit 3' to transmit digital signals (such as multicarrier signals) via the transmit antennas TX1, TX2, . . . , TXN, and in this example they also include at least one receive antenna (not shown) enabling the transmitter device 1A' to receive signals, such as for example signals from the receiver device 1B' and containing an estimate of the transmission channels between the antennas TX1, TX2, . . . , TXN and the antenna RX.

The ROM 5' of the transmitter device 1A' constitutes a data medium in accordance with the invention that is readable by the processor of the control unit 3' and that stores a computer program in accordance with the invention, including instructions for executing steps of a multicarrier signal transmission method in accordance with the invention in its second implementation, as described below with reference to FIG. 5, in a particular variant implementation.

The receiver device 1B' has hardware architecture similar to the receiver device 1B described above for the first embodiment. In the presently-described implementation, the instructions for executing steps of the reception method in accordance with the invention in the second implementation are contained in a computer program stored in a ROM of the receiver device 1B'.

Figure 5:
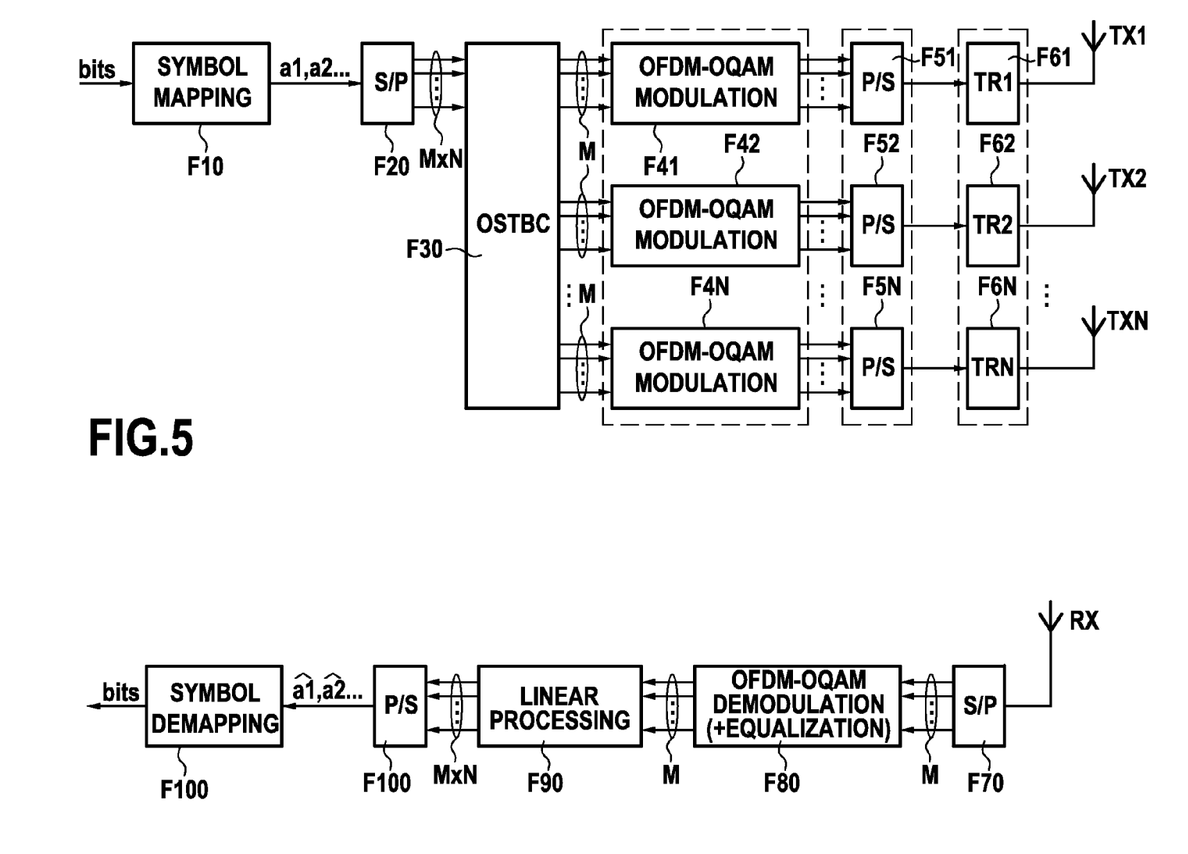
FIG. 5 shows the main steps of a transmission method, a reception method, and a communication method in accordance with the invention in a second implementation in which they are performed respectively by the transmitter device, by the receiver device, and by the MISO communications system of FIG. 4.

FIG. 5 shows the main steps of a method of transmitting a multicarrier signal, of a reception method, and of a communications method in accordance with the invention as performed respectively by the device 1A', the device 1B', and the communications system 1' of FIG. 4 in a second implementation in which use is made on transmission of a real orthogonal space-time code of coding rate 1 for distributing the OFDM-OQAM symbols over the N transmit antennas.

More precisely, in this second implementation, a sequence of bits (which may possibly be coded and interleaved as in the first implementation) is transformed into a run of real symbols ($a_1, a_2, \ldots$) of a PAM type constellation (step F10') in known manner. Since the invention applies to any type of OQAM modulation, the PAM constellation may be of any order and it is possible to envisage using other constellations.

The real PAM symbols (also referred to as real value PAM symbols) are then distributed over M subcarriers and N antennas during a series-to-parallel conversion step (step F20) so as to form OFDM-OQAM symbols in the frequency domain for each transmit antenna. The real PAM symbol associated with the $m^{th}$ subcarrier at instant n is written $a_{m,n}$.

The real PAM symbols $a_{m,n}$ are then coded during a coding step, in this example using one space dimension and one time dimension, so as to generate N coded symbol sequences for the N transmit antennas (step F30).

More precisely, as mentioned above, in the presently-described second implementation, it is envisaged coding symbols $a_{m,n}$ over N transmit antennas by means of a real orthogonal space-time code of coding rate 1 (i.e. all of the components of the coding matrix GRN defining this code are real). Such codes are known to the person skilled in the art, and they are described in particular in the above-mentioned document by S. Alamouti for a number of transmission antennas N equal to 2, and in the document by V. Tarokh et al. entitled "Space-time block codes from orthogonal designs", IEEE Transactions on Information Theory, Vol. 45, 1999, for an arbitrary number of transmit antennas.

In general, these codes are defined by a coding matrix of dimensions N×N. To illustrate the invention, it is assumed in this example that N=2, and it is envisaged to perform space-time coding of real symbols $a_{m,n}$ distributed over the M subcarriers as defined by the following orthogonal real coding matrix GR2 deduced from Alamouti's matrix GC2 described above:

$$GR2 = \begin{bmatrix} a_{m,n} & -a_{m,n+1} \\ a_{m,n+1} & a_{m,n} \end{bmatrix}$$
$$\underline{\text{antenna } \downarrow, \text{time} \rightarrow}$$

the $j^{th}$ row of the matrix GR2 giving the symbols transmitted during each symbol time over antenna TXj.

For N=4, an example of a real orthogonal coding matrix GR4 of coding rate 1 that is suitable for application during step F30 in the context of the invention is as follows:

$$GR4 = \begin{bmatrix} a_{m,n} & a_{m,n+1} & a_{m,n+2} & a_{m,n+3} \\ -a_{m,n+1} & a_{m,n} & -a_{m,n+3} & a_{m,n+2} \\ -a_{m,n+2} & a_{m,n+3} & a_{m,n} & -a_{m,n+1} \\ -a_{m,n+3} & -a_{m,n+2} & a_{m,n+1} & a_{m,n} \end{bmatrix}$$
$$\underline{\text{antenna } \downarrow, \text{time} \rightarrow}$$

Naturally, the invention applies to other real orthogonal space-time codes of coding rate 1.

Thus, during coding step F30, for each subcarrier m, m= 1, ..., M, the matrix GR2 is applied to the real value symbols $a_{m,n}$ associated with that subcarrier. This produces N coded symbol sequences for the N antennas, i.e. each resulting coded sequence is associated with a respective transmit antenna. These coded symbols are real symbols since the matrix GR2 is a real matrix.

The N coded symbol sequences are then modulated respectively for the N transmit antennas using the OFDM-OQAM modulation scheme (i.e. each coded symbol of a sequence associated with a transmit antenna modulates a subcarrier with an OFDM-OQAM symbol associated with the antenna) (step F41 for the antenna TX1, F42 for the antenna TX2, etc. grouped together as step F40), in particular with the help of an inverse fast Fourier transform IFFT and a prototype filter f (step F40), and then converted in a parallel-to-series conversion operation performed independently for each antenna (step F50 grouping together steps F51, F52, F5N performed respectively for each of the antennas TX1, TX2, ..., TXN) in similar manner to the first implementation for antenna TX.

Then, in accordance with the invention, for each antenna TXj, j=1, ..., N, the OFDM-OQAM symbols forming the coded OFDM/OQAM multicarrier signal s(j) for this antenna TXj are filtered by a time-reversal prefilter TRj (step F61 for the antenna TX1, F62 for the antenna TX2, ..., F6N for the antenna TXN, which steps are grouped together as filter step F60), defined on the basis of an estimate of the transmission channel 2_j'.

The impulse response of the prefilter TRj applied to antenna TXj, j=1, ..., N is obtained from the time reverse and conjugated impulse response of an estimate of the transmission channel 2_j' between the transmit antenna TXj and the receive antenna RX. In other words, the vector $h^{TR(j)}$ of the coefficients of the time-reversal prefilter TRj for transmit antenna TXj are given by:

$$h^{TR(j)} = ((\hat{h}_{L-1}^{(j)})^*, (\hat{h}_{L-2}^{(j)})^*, \ldots, (\hat{h}_0^{(j)})^*)$$

where $\hat{h}^{(j)} = (\hat{h}_0^{(j)}, \hat{h}_1^{(j)}, \ldots, \hat{h}_{L-1}^{(j)})$ designates the estimated coefficients of the propagation channel 2_j' between the transmit antenna TXj and the receive antenna RX.

The coefficients of the filters TRj may be normalized over the set of transmit antennas in order to avoid modifying the transmission power of the multicarrier signals. The resulting multicarrier signal for each antenna TXj, j=1, ..., N after these filter steps is written $x^{(j)}$ with $x^{(j)} = s^{(j)} \otimes h^{TR(j)}$ The estimate $\hat{h}^{(j)} = (\hat{h}_0^{(j)}, \hat{h}_1^{(j)}, \ldots, \hat{h}_{L-1}^{(j)})$ of the coefficients of each channel 2_j' may be obtained as in the first implementation, either via a return path from the receiver 1B' or by assuming that the reciprocity for the propagation channel on the basis of the coefficients estimated during transmission in the direction 1B' to 1A'.

The filtered multicarrier signals $x^{(j)}$, j=1, ..., N are then transmitted over the propagation channel 2' via their respective transmit antennas TXj, j=1, ..., N. The signal made up of the multicarrier signals $x^{(j)}$ is a signal in accordance with the invention.

The multicarrier signal received via the receive antenna RX of the receiver device 1B' after the signals $x^{(j)}$, j= 1, ..., N have propagated over the channel 2' is written y'. The received signal y' is equal to the sum of the signals received from each transmit antenna TXj, j=1, ..., N, i.e.:

$$y' = \sum_{j=1}^{N} x^{(j)} \otimes h^{(j)} + \eta$$

where $\eta$ designates Gaussian additive white noise.

The various symbols of the received multicarrier signal y' are distributed during series-to-parallel conversion over M subcarriers (step F70), and then a fast Fourier transform FFT is applied in order to demodulate the OFDM-OQAM symbols (step F80) in similar manner to the first implementation.

In the example of space-time coding performed with the help of the above-described matrix GR2, for each carrier m, the symbols obtained after FFT transformation for each carrier m at instants nT and (n+1)T are given by the following equations:

$$y'_{m,n} = H_{m,n}^{(R)0} a_{m,n} + H_{m,n}^{(R)1} a_{m,n+1} + \eta_{m,n}$$

$$y'_{m,n+1} = -H_{m,n}^{(R)0} a_{m,n+1} + H_{m,n}^{(R)1} a_{m,n} + \eta_{m,n+1}$$

where $\eta_{m,n}$ and $\eta_{m,n+1}$ designate the components of the Gaussian additive white noise $\eta$ for the $m^{th}$ carrier at instant nT.

This expression may also be written in matrix form as follows:

$$\begin{bmatrix} y'_{m,n} \\ y'_{m,n+1} \end{bmatrix} = \underbrace{\begin{bmatrix} H_{m,n}^{R(0)} & H_{m,n}^{R(1)} \\ H_{m,n}^{R(1)} & -H_{m,n}^{R(0)} \end{bmatrix}}_{HC} \begin{bmatrix} a_{m,n} \\ a_{m,n+1} \end{bmatrix} + \begin{bmatrix} \eta_{m,n} \\ \eta_{m,n+1} \end{bmatrix}$$

The matrix HC is an orthogonal matrix so it is possible using simple linear processing that is itself known to retrieve the transmitted symbols $a_{m,n}$. An estimate $\hat{a}_{m,n}$ of the real symbols is thus obtained on the basis of the symbols $y'_{m,n}$ from the FFT by using this linear processing performed on each subcarrier m (step F90).

After parallel-to-series conversion of the real symbols as estimated for each carrier (step F100, performing processing that is the inverse of step F20), the symbols are converted into bits (step F110) using the constellation selected on transmission as applied in step F10. The bits are then deinterleaved and decoded if the bits that were processed in step F10 were themselves coded and interleaved, by using an operation that is the inverse of the operation that was performed on transmission.

Thus, as mentioned above, the transmission method of the invention advantageously makes it possible to eliminate the intrinsic interference terms generated by using OFDM/OQAM modulation, including in a MISO system.

It can thus be understood that by applying a propagation channel time-reversal prefilter for each transmit antenna, the invention provides a transmission scheme that does not suffer from loss of spectrum efficiency and that makes it possible to use space-time codes with a coding rate of 1, while preserving a reception scheme that is simple.

In the second implementation described herein, orthogonal real space-time coding is described with a coding rate of 1 for symbols $a_{m,n}$ (i.e. the symbols $a_{m,n}$ are distributed in time and in space). Nevertheless, the invention also applies to orthogonal coding with a coding rate of 1 of real value symbols $a_{m,n}$ using a space dimension and a frequency dimension (space-frequency coding). For N=2 transmit antennas, such a code may be defined by way of example by the following orthogonal real matrix GRF2:

$$GRF2 = \underbrace{\begin{bmatrix} a_{m,n} & -a_{m+1,n} \\ a_{m+1,n} & a_{m,n} \end{bmatrix}}_{antenna \downarrow, carrier \rightarrow}$$

the $j^{th}$ row of the matrix GRF2 giving the symbols transmitted on each carrier via the antenna TXj.

In addition, in the second implementation described herein, an orthogonal real code of coding rate 1 is described. Nevertheless, the invention also applies to non-orthogonal space-time real codes (in which case non-linear decoding should be performed on reception), and also to codes having a coding rate of less than 1.

In the second implementation described herein, the use of a space-time code on transmission is described. Nevertheless, the invention also applies to a "simple" MISO system that does not perform space-time or space-frequency coding (and that therefore does not require a linear processing module on reception).

In the implementations described herein, OFDM-OQAM type multicarrier signal transmission is described. Nevertheless, the principle of time reversal applied to OQAM modulation can also be used for transmitting single-carrier signals. It should be observed that a single-carrier signal is a special case of a multicarrier signal in which M=1 (in other words, the reasoning set out in the present description for a multicarrier situation can still be applied, by putting M=1, where M is the number of carriers).

Under such circumstances, for each transmit antenna of the transmitter device, the transmission method comprises:

a step of filtering OQAM symbols associated with that transmit antenna by means of a time-reversal filter defined from an estimate of a transmission channel between the transmit antenna and the receive antenna; and a step of transmitting the filtered OQAM symbols via the transmit antenna over the channel.

It is also possible to envisage that the method of transmitting at least one single-carrier signal presents in combination some or all of the above-mentioned characteristics (e.g. real and orthogonal space-time or space-frequency coding, etc.).

In general, the time-reversal principle described above may be applied to any signal making use of real orthogonality in order to obtain advantages that are similar to those of the invention.

The invention claimed is:

1. A transmission method for transmitting at least one multicarrier signal made up of Orthogonal Frequency Division Multiplexing Offset Quadrature Amplitude Modulation (OFDM-OQAM) symbols to a receive antenna of a receiver device, said transmission method being for use by a transmitter device having at least one transmit antenna, said transmission method comprising, for each transmit antenna of the at least one transmit antenna of the transmitter device, the processes of:

filtering, using the transmitter device, the OFDM-OQAM symbols associated with the transmit antenna using a time-reversal prefilter defined from an estimate of the transmission channel between said transmit antenna and said receive antenna; and transmitting, using the transmitter device, the filtered OFDM-OQAM symbols via said transmit antenna over said transmission channel.

2. A transmission method according to claim 1, wherein the transmitter device has a number N of transmit antennas greater than 1, said transmission method further comprising a coding process during which coding is applied to real value symbols, the coding being defined by a determined real coding matrix generating N coded symbol sequences associated with said N transmit antennas, a coded symbol of a coded symbol sequence associated with a transmit antenna modulating a carrier of a said OFDM-OQAM symbol associated with that antenna.

3. A transmission method according to claim 2, wherein the real coding matrix is a real orthogonal matrix.

4. A transmission method according to claim 2, wherein the coding applied during the coding step has a coding rate of 1.

5. A transmission method according to claim 2, wherein the coding applied during the coding step is space-time coding.

6. A transmission method according to claim 2, wherein the coding applied during the coding step is space-frequency coding.

7. A computer configured to implement the transmission method according to claim 1.

8. A non-transitory computer readable storage medium storing a computer program including instructions for executing steps of the transmission method according to claim 1 when executed by a computer.

9. A reception method for receiving an Orthogonal Frequency Division Multiplexing Offset Quadrature Amplitude Modulation (OFDM-OQAM) type multicarrier signals including OFDM-OQAM symbols as transmitted by at least one transmit antenna of a transmitter device, wherein the transmitting device for each transmit antenna of the at least one transmit antenna performed filtering on the OFDM-OQAM symbols associated with the transmit antenna using a time-reversal prefilter defined from an estimate of a transmission channel between said transmit antenna and a receive antenna in order to generate and subsequently transmit the OFDM-OQAM signals, the reception method comprising:
  receiving, using the receive antenna at a receiver device, an OFDM-OQAM type multicarrier signal corresponding to the sum of the OFDM-OQAM type multicarrier signals received from each of the at least one transmit antenna of the transmitter device; and
  demodulating, by a demodulator in the receiver device, said received OFDM-OQAM type multicarrier signal corresponding to the sum of the received OFDM-OQAM type multicarrier signals received from each of the at least one transmit antenna in order to recover the corresponding OFDM-OQAM symbols.

10. A communication method comprising:
  filtering, using a transmitter device, Orthogonal Frequency Division Multiplexing Offset Quadrature Amplitude Modulation (OFDM-OQAM) symbols associated with at least one transmit antenna using a time-reversal prefilter defined from an estimate of a transmission channel between each of the at least one transmit antenna and a receive antenna;
  transmitting, using the transmitter device, the filtered OFDM-OQAM symbols via said at least one transmit antenna over said transmission channel as a corresponding OFDM-OQAM type multicarrier signal;
  receiving, using the receive antenna at a receiver device, an OFDM-OQAM type multicarrier signal corresponding to the sum of the OFDM-OQAM type multicarrier signals received from each of the at least one transmit antenna of the transmitter device; and
  demodulating, by a demodulator in the receiver device, said received OFDM-OQAM type multicarrier signal corresponding to the sum of the received OFDM-OQAM type multicarrier signals received from each of the at least one transmit antenna in order to recover the corresponding OFDM-OQAM symbols.

11. A transmitter device having at least one transmit antenna and configured for transmitting at least one Orthogonal Frequency Division Multiplexing Offset Quadrature Amplitude Modulation (OFDM-OQAM) type multicarrier signal via said at least one transmit antenna of said transmitter device to a receive antenna of a receiver device, said transmitter device comprising in association with each transmit antenna:
  a filter in said transmitter device which filters OFDM-OQAM symbols associated with that transmit antenna, said filter comprising a time-reversal prefilter defined on the basis of an estimate of a transmission channel between said transmit antenna and said receive antenna;
  said transmitter device being configured to transmit the filtered OFDM-OQAM symbols via said transmit antenna over said transmission channel.

12. A transmitter device according to claim 11, having a number N of transmit antennas greater than 1 and further configured to apply coding to real value symbols, the coding being defined by a determined real coding matrix generating N coded symbol sequences associated with said N transmit antennas, a coded symbol of a coded symbol sequence associated with a transmit antenna modulating a carrier of a said OFDM-OQAM symbol associated with that antenna.

13. A receiver device for receiving Orthogonal Frequency Division Multiplexing Offset Quadrature Amplitude Modulation (OFDM-OQAM) type multicarrier signals including OFDM-OQAM symbols as transmitted by at least one transmit antenna of a transmitter device, wherein the transmitting device for each transmit antenna of the at least one transmit antenna filtered the OFDM-OQAM symbols associated with the transmit antenna using a time-reversal prefilter defined from an estimate of a transmission channel between said transmit antenna and a receive antenna in order to generate and subsequently transmit the OFDM-OQAM signals, the receiver device comprising:
  a receiver and the receiving antenna for receiving an OFDM-OQAM type multicarrier signal corresponding to the sum of the OFDM-OQAM type multicarrier signals received from each of the at least one transmit antenna of the transmitter device; and
  a demodulator for demodulating said received OFDM-OQAM type multicarrier signal corresponding to the sum of the OFDM-OQAM type multicarrier signals received from each of the at least one transmit antenna in order to recover the corresponding OFDM-OQAM symbols.

14. A communications system comprising:
  a transmitter device configured for:
    filtering Orthogonal Frequency Division Multiplexing Offset Quadrature Amplitude Modulation (OFDM-OQAM) symbols associated with at least one transmit antenna using a time-reversal prefilter defined from an estimate of a transmission channel between each of the at least one transmit antenna and a receive antenna;
    transmitting the filtered OFDM-OQAM symbols via said at least one transmit antenna over said transmission channel as a corresponding OFDM-OQAM type multicarrier signal; and
  a receiver device configured for:
    receiving, using the receive antenna an OFDM-OQAM type multicarrier signal corresponding to the sum of the OFDM-OQAM type multicarrier signals received from each of the at least one transmit antenna of the transmitter device; and
    demodulating said received OFDM-OQAM type multicarrier signal corresponding to the sum of the OFDM-OQAM type multicarrier signals received from each of the at least one transmit antenna in order to recover the corresponding OFDM-OQAM symbols.

\* \* \* \* \*